United States Patent
Sutton et al.

(10) Patent No.: US 10,501,175 B2
(45) Date of Patent: Dec. 10, 2019

(54) TEETERING ROTOR HUB SYSTEM

(71) Applicant: Bell Helicopter Textron Inc., Fort Worth, TX (US)

(72) Inventors: Drew Alan Sutton, Hurst, TX (US); Frank Brad Stamps, Colleyville, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 320 days.

(21) Appl. No.: 15/401,233

(22) Filed: Jan. 9, 2017

(65) Prior Publication Data
US 2018/0194462 A1 Jul. 12, 2018

(51) Int. Cl.
| | |
|---|---|
| B64C 27/43 | (2006.01) |
| B64C 27/78 | (2006.01) |
| B64C 27/605 | (2006.01) |
| B64C 27/48 | (2006.01) |
| B64C 27/72 | (2006.01) |
| B64C 27/82 | (2006.01) |

(52) U.S. Cl.
CPC .............. *B64C 27/43* (2013.01); *B64C 27/48* (2013.01); *B64C 27/605* (2013.01); *B64C 27/72* (2013.01); *B64C 27/78* (2013.01); *B64C 27/82* (2013.01); *B64C 2027/8227* (2013.01)

(58) Field of Classification Search
CPC ......... B64C 27/43; B64C 27/48; B64C 27/54; B64C 27/58; B64C 27/59; B64C 27/605; B64C 27/72; B64C 27/78; B64C 2027/8227; B64C 27/82; F01D 7/00; F01D 7/02
See application file for complete search history.

(56) References Cited

U.S. PATENT DOCUMENTS

| | | | | |
|---|---|---|---|---|
| 3,156,302 A | * | 11/1964 | Jordan | B64C 27/37 416/148 |
| 3,193,019 A | * | 7/1965 | Drees | B64C 27/43 416/114 |
| 4,349,316 A | | 9/1982 | Hughes et al. | |
| 6,764,280 B2 | * | 7/2004 | Sehgal | B64C 27/35 416/104 |

(Continued)

FOREIGN PATENT DOCUMENTS

| | | |
|---|---|---|
| CA | 2974257 A1 | 7/2018 |
| EP | 2778062 A1 | 9/2014 |

(Continued)

OTHER PUBLICATIONS

Hiroshi, WO 2011/007850, Jan. 20, 2011, machine translation (Year: 2011).*

(Continued)

*Primary Examiner* — Hung Q Nguyen
*Assistant Examiner* — Mark L. Greene
(74) *Attorney, Agent, or Firm* — Daniel J. Chalker; Edwin S. Flores; Chalker Flores, LLP

(57) ABSTRACT

The present invention includes a rotor hub system, comprising: a teetering rotor hub disposed about a mast, the teetering rotor hub comprising: a first and a second yoke; each connected to a set of rotor blades, wherein the second set of rotor blades and the first set of rotor blades are disposed in a common plane, but the first and the second yoke do not come in contact.

23 Claims, 13 Drawing Sheets

(56) References Cited

U.S. PATENT DOCUMENTS

2004/0245376 A1* 12/2004 Muren .................. A63H 27/12
244/17.11

FOREIGN PATENT DOCUMENTS

| EP | 3345830 A1 | 7/2018 |
|---|---|---|
| WO | 2004103814 A1 | 12/2004 |
| WO | 2011007850 A1 | 1/2011 |

OTHER PUBLICATIONS

European Patent Office, Extended European Search Report for EP Appl. Serial No. 17182195.2 dated Nov. 28, 2017, 8 pp.
Canadian Intellectual Property Office, Examination Report for Canadian Application No. 2,974,257 dated Sep. 26, 2018, 4 pp.
European Patent Office, Communication pursuant to Article 94(3) EPC for EP Application No. 17182195.2 dated Sep. 30, 2019, 5 pp.

\* cited by examiner

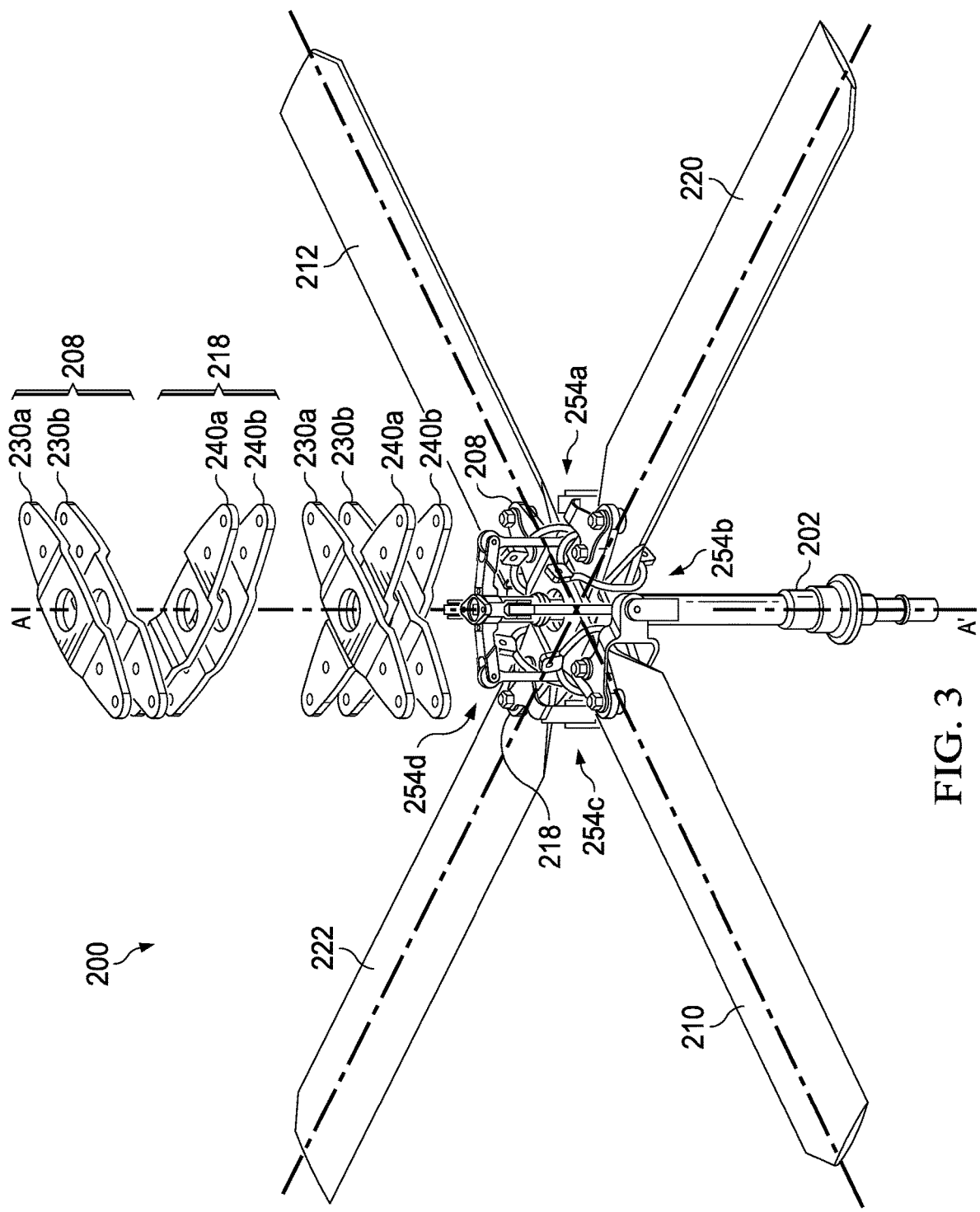

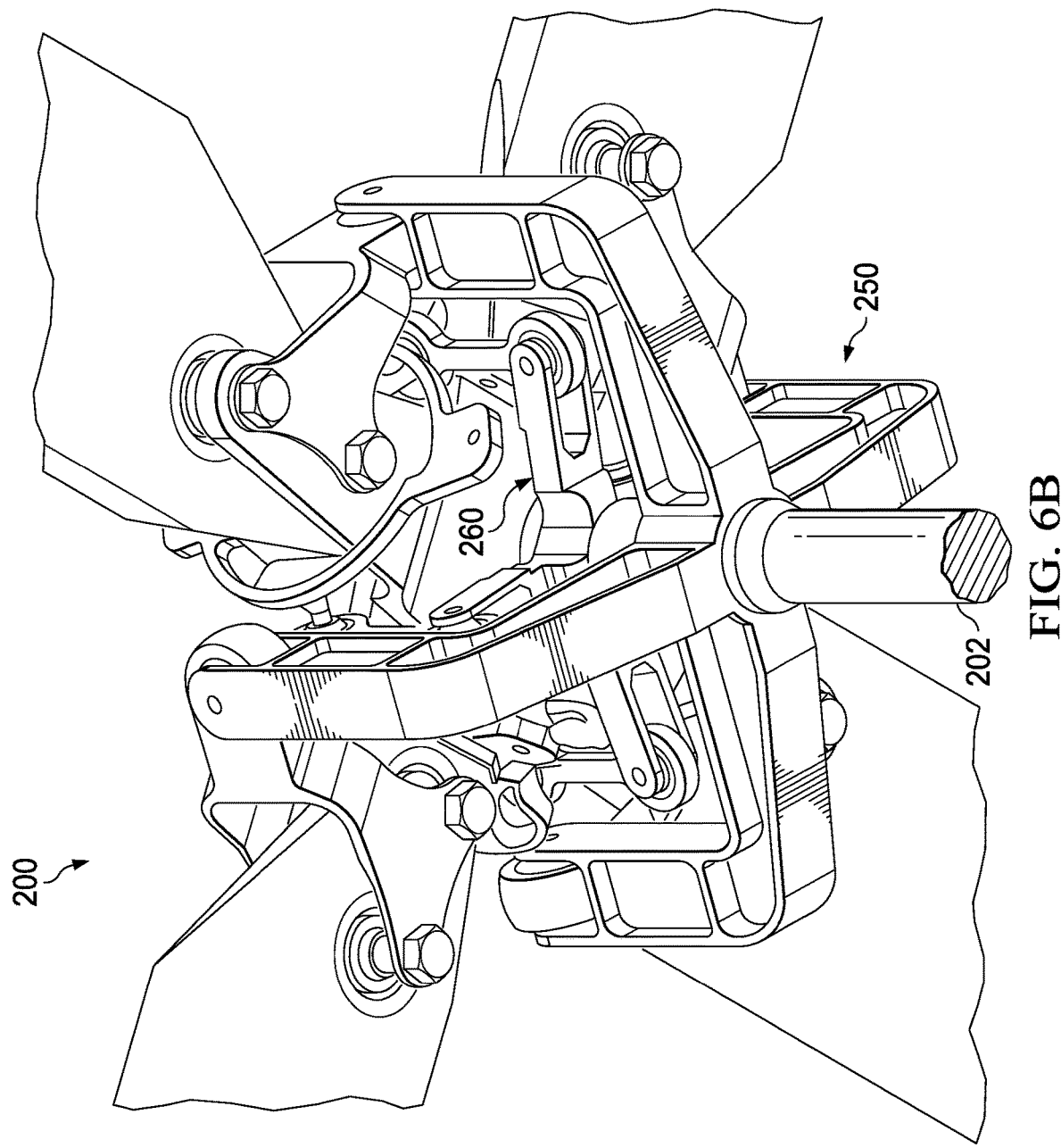

TEETERING ROTOR HUB SYSTEM

TECHNICAL FIELD OF THE INVENTION

This disclosure relates to rotor hub systems, in particular, teetering tail rotor hub systems of a rotorcraft, e.g., a helicopter.

BACKGROUND OF THE INVENTION

Helicopters often include a tail rotor assembly, which includes two or more blades that rotate about a central axis of rotation to generate thrust. The thrust can be used to counter a torque effect created by a main rotor assembly and can also be used to allow a pilot to control the yaw of a helicopter. The amount and direction of the thrust is generally controlled by collectively changing the angles of attach of all of the tail rotor blades together.

Tail rotor blades can also accommodate at least some amount of cyclic flapping and feathering to counter the dissymmetry of lift phenomenon that occurs as a helicopter moves through the air. For example, as a tail rotor blade moves in the same direction as the helicopter movement (e.g., an advancing blade in forward flight), the tail rotor blade experiences a greater air speed, generates more thrust, and flaps in the direction opposite to the thrust. In another example, as a tail rotor blade moves in the opposite direction as the helicopter movement (e.g., a retreating blade in forward flight), the tail rotor blade experiences a lower air speed, generates less thrust, and flaps in the direction of the thrust. To compensate for the dissymmetry of lift and control the amount of flapping, tail rotor blades and pitch control mechanism can be designed to increase or decrease the angle of attack of the blades as the blades move in the same direction as the helicopter movement and change the angle of attack of the blades as they move in the opposite direction of the helicopter movement. The cyclic changing of the angles of attack that is in direct response to the flapping angle is commonly referred to as feathering or delta-3 and is used to limit flapping angles.

SUMMARY OF THE INVENTION

This disclosure describes teetering rotor hub systems, for example, a tail rotor hub system with two separate teetering rotor hubs.

In one embodiment, the present invention includes a rotor hub system, comprising: a first teetering rotor hub disposed about a mast, the first teetering rotor hub comprising: a first yoke; a first set of rotor blades connected to the first yoke, the first set of rotor blades comprising a first rotor blade connected at a first end of the first yoke and a second rotor blade connected at a second end of the first yoke opposite the first end; a second teetering rotor hub separate from the first rotor hub, the second rotor hub comprising: a second yoke; and a second set of rotor blades connected to the second yoke, the second set of rotor blades comprising a third rotor blade connected at a first end of the second yoke and a fourth rotor blade connected at a second end of the second yoke opposite the first end, wherein the second set of rotor blades and the first set of rotor blades are disposed in a common plane. In one aspect, the first teetering rotor hub is free from contact with the second teetering rotor hub. In another aspect, the first set of rotor blades are rotatably offset from the second set of rotor blades by about ninety degrees with respect to a central longitudinal axis of the mast. In another aspect, the first yoke is free from contact with the second yoke. In another aspect, the first yoke comprises a bridge portion adjacent to and offset from a portion of the second yoke. In another aspect, the second yoke comprises a flat plate extending from the third rotor blade to the fourth rotor blade. In another aspect, the second yoke comprises a second bridge portion adjacent to and offset from the first mentioned bridge portion of the first yoke. In another aspect, the rotor hub system further comprises: a pitch assembly connected to the first set of rotor blades and the second set of rotor blades, the pitch assembly configured to control a pitch of the first set of rotor blades and the second set of rotor blades; and a drive hub assembly connected to a mast and coupled to the first yoke and the second yoke, the drive hub assembly configured to drive the first yoke and the second yoke in response to rotation of the mast. In another aspect, the drive hub assembly comprises a mast coupling and four drive members extending from the mast coupling, a first drive member coupled to the first yoke proximate the first rotor blade, a second drive member coupled to the first yoke proximate the second rotor blade, a third drive member coupled to the second yoke proximate the third rotor blade, and a fourth drive member coupled to the second yoke proximate the fourth rotor blade. In another aspect, each drive member of the four drive members comprises: a drive hub arm attached to the mast coupling and extending outwardly from the mast coupling; a drive extension coupled to the drive hub arm and a respective yoke; and a drive bearing coupling the drive hub arm to the drive extension, wherein the drive extension is configured to pivot about the drive bearing. In another aspect, each drive hub arm of the four drive members is configured to flex in torsion and resist shear forces. In another aspect, each drive hub arm comprises an I-beam cross section along a length of the respective drive hub arm. In another aspect, the drive hub assembly connects to the first yoke and the second yoke at locations radially outward of the pitch assembly with respect to a central longitudinal axis of the mast. In another aspect, the drive hub assembly extends from the mast on a first, lower side of the first yoke, and the pitch assembly extends from the mast on a second, upper side of the first yoke opposite the first, lower side. In another aspect, the drive hub assembly and the pitch assembly each extend from the mast on a first, lower side of the first yoke. In another aspect, the pitch assembly comprises a pitch hub connected to the mast, a plurality of pitch links pivotally coupled to the pitch hub, and a plurality of pitch horns coupled to the pitch links and the first set of rotor blades and the second set of rotor blades. In another aspect, the pitch hub connects to a single degree of freedom collective control system.

In one embodiment, the present invention includes a tail rotor hub system, comprising: a first yoke and a second yoke disposed about a rotor mast, wherein a first portion of the first yoke overlaps a second portion of the second yoke, the first portion and the second portion spaced separately from each other, the first yoke configured to teeter about a first teetering axis, and the second yoke configured to teeter about a second teetering axis, wherein the first teetering axis and the second teetering axis are disposed in a common plane; a first set of rotor blades connected to the first yoke, the first set of rotor blades comprising a first rotor blade connected at a first end of the first yoke and a second rotor blade connected at a second end of the first yoke opposite the first end; and a second set of rotor blades connected to the second yoke, the second set of rotor blades comprising a third rotor blade connected at a first end of the second yoke and a fourth rotor blade connected at a second end of the second yoke opposite the first end. In one aspect, the first set of rotor blades and the second set of rotor blades are disposed in the common plane. In another aspect, the first yoke comprises a flat plate extending from the first rotor blade to the second rotor blade, and the second yoke comprises a plate having a bridge portion and extending from the third rotor blade to the fourth rotor blade. In another aspect, the first set of rotor blades are offset from the second set of rotor blades by about ninety degrees. In another aspect, the tail rotor hub system further comprises: a drive hub assembly coupled to a mast, the first yoke, and the second yoke, the drive hub assembly configured to drive the first yoke and the second yoke in response to rotation of the mast, the drive hub assembly comprising: a plurality of drive hub arms attached to the mast and extending outwardly from the mast; a plurality of drive extensions coupled to the plurality of drive hub arms and the first yoke and the second yoke; and a plurality of drive bearings coupling the plurality of drive hub arms to the plurality of drive extensions, wherein the plurality of drive extensions are configured to teeter about the plurality of drive bearings. In another aspect, a first drive extension of the plurality of drive extensions attaches to the first end of the first yoke, a second drive extension of the plurality of drive extensions attaches to the second end of the first yoke, a third drive extension of the plurality of drive extensions attaches to the first end of the second yoke, and a fourth drive extension of the plurality of drive extensions attaches to the second end of the second yoke. In another aspect, the tail rotor hub system further comprises a pitch assembly connected to the first set of rotor blade and the second set of rotor blades, the pitch assembly configured to control a pitch of the first set of rotor blades and the second set of rotor blades. In another aspect, the drive hub assembly connects to the first yoke and the second yoke at locations radially outward of the pitch assembly with respect to a rotational axis of the mast.

In yet another embodiment, the present invention includes a method, comprising: providing a first teetering rotor hub about a mast, the first teetering rotor hub comprising: a first yoke; a first set of rotor blades connected to the first yoke, the first set of rotor blades comprising a first rotor blade connected at a first end of the first yoke and a second rotor blade connected at a second end of the first yoke opposite the first end; providing a second teetering rotor hub about the mast and separate from the first teetering rotor hub, the second teetering rotor hub comprising: a second yoke; and a second set of rotor blades connected to the second yoke, the second set of rotor blades comprising a third rotor blade connected at a first end of the second yoke and a fourth rotor blade connected at a second end of the second yoke opposite the first end; and disposing a first teetering axis of the first teetering rotor hub and a second teetering axis of the second teetering rotor hub in a common plane.

BRIEF DESCRIPTION OF THE DRAWINGS

For a more complete understanding of the features and advantages of the present invention, reference is now made to the detailed description of the invention along with the accompanying figures. Like reference numbers and designations in the various drawings indicate like elements.

FIG. 3 is a schematic perspective view of a first yoke and the second yoke of an example rotor hub system.

FIGS. 6A and 6B show isometric views of the present invention as used in context of the rotor hub system.

DETAILED DESCRIPTION OF THE INVENTION

Figure 1:
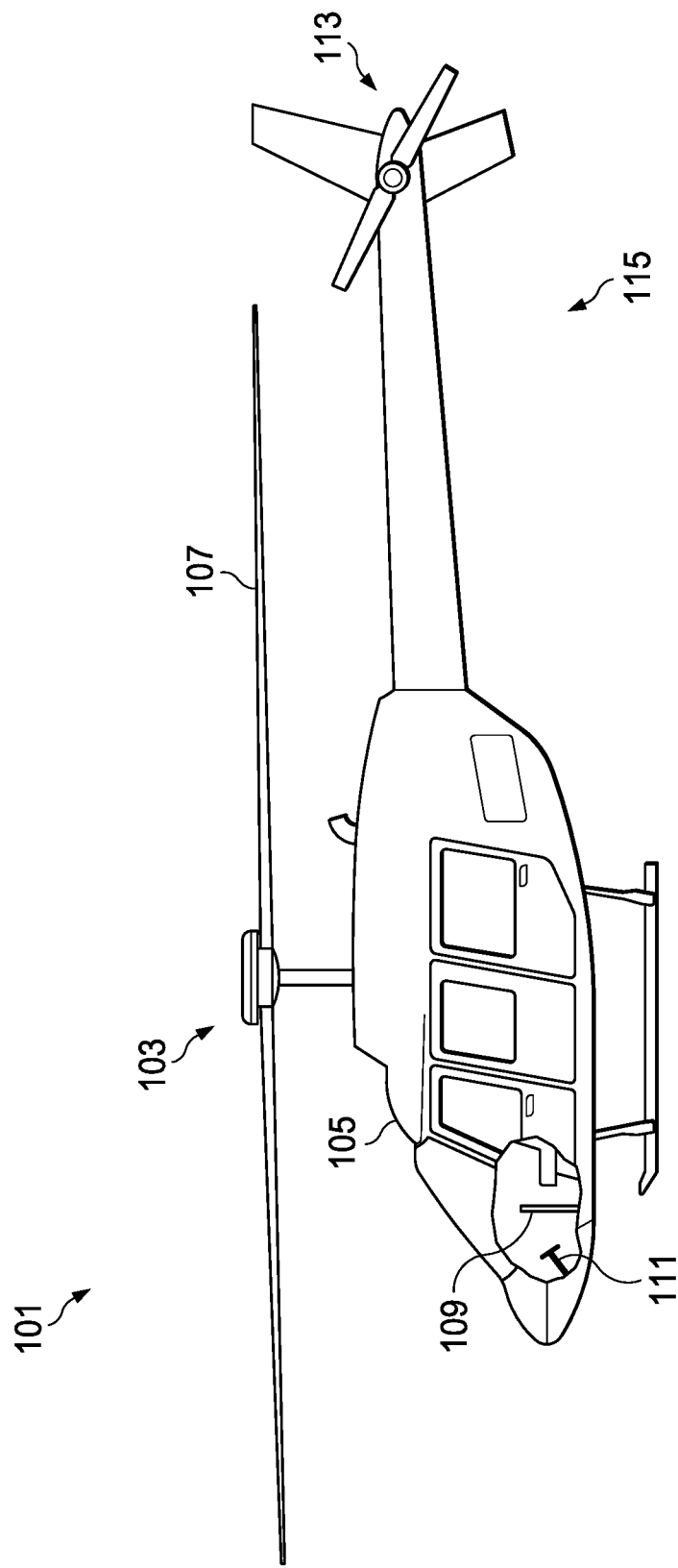
FIG. 1 is a side view of an example helicopter.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure describes rotor hub systems, such as a tail rotor hub system with two separate teetering rotor hubs attached to a mast of a rotorcraft. The teetering rotor hubs are configured to teeter about respective teetering axes and can operate independently from each other as if each of the teetering rotor hubs is disposed on the mast by itself. For example, the teetering rotor hubs may not impart mechanical loads onto each other. In some implementations, the teetering axes of the teetering rotor hubs lie in substantially the same plane, for example, such that the first teetering axis of the first rotor hub intersects the second teetering axis of the second rotor hub. For example, the two separate teetering rotor hubs can include respective sets of rotor blades that lie in a shared, common plane. In some instances, the first teetering rotor hub can connect to a first set of two blades and the second teetering rotor hub can connect to a second set of two blades, where the first set and the second set of blades are disposed in substantially a common plane. In some implementations, a yoke of the first teetering rotor hub is shaped to avoid contact with a yoke of the second teetering rotor hub disposed about the mast. For example, outboard edges of the two rotor yokes can lie in the same common plane and connect to respective rotor blades, while a central portion of one or both of the rotor yokes can be shaped with a bridge, offset, or other shaped profile to avoid contact with an overlapping portion of the other yoke.

In some conventional tail rotor hub systems, a first teetering rotor hub is stacked with a second teetering rotor hub such that the first teetering rotor hub and respective blades are disposed in a first plane, and a second teetering rotor hub and respective blades are disposed in a second plane offset from the first plane. This stacked offset between the blades of conventional tail rotor hub systems can create aerodynamic wake interaction problems with increased loads, non-linear thrust output induced handling quality issues, increased noise relative to in-plane rotor blades, and/or mast moments due to the stacking offset distance, among other problems. The present disclosure describes a tail rotor hub system including two teetering rotor hubs with rotor blades disposed in a shared, substantially common plane, for example, avoiding the drawbacks of a stacked blade configuration.

FIG. 1 is a schematic side view of an example helicopter 101 that can utilize a rotor hub system described herein. However, this disclosure is applicable to any aircraft that includes a rotor blade assembly, such as a tail rotor hub assembly. Example helicopter 101 includes a main rotary system 103 carried by a fuselage 105. Rotor blades 107 connected to the main rotary system 103 provide flight for helicopter 101. The rotor blades 107 are controlled by multiple controllers within fuselage 105. The pitch of each rotor blade 107 can be manipulated to selectively control direction, thrust, and lift of the helicopter 101. For example, during flight a pilot can manipulate the cyclic controller 109 for changing the pitch angle of rotor blades 107 and/or manipulate pedals 111, thus providing vertical, horizontal, and yaw flight movement. Helicopter 101 also includes a tail rotor assembly 113 and an empennage 115. Tail rotor assembly 113 includes two or more blades (e.g., four blades) that are rotated about an axis of rotation in either a clockwise or counterclockwise direction. Tail rotor assembly 113 counters the torque effected by the main rotary system 103 and allows a pilot to control the yaw of the helicopter 101. For example, the pitch of each rotor blade of the tail rotor assembly 113 can be manipulated to control direction and thrust of the tail rotor assembly 113, for example, to counter a torque on helicopter 101 from the main rotary system 103. The main rotary system 103 and/or the tail rotor assembly 113 can include a rotor hub system as disclosed herein.

Figure 2A:
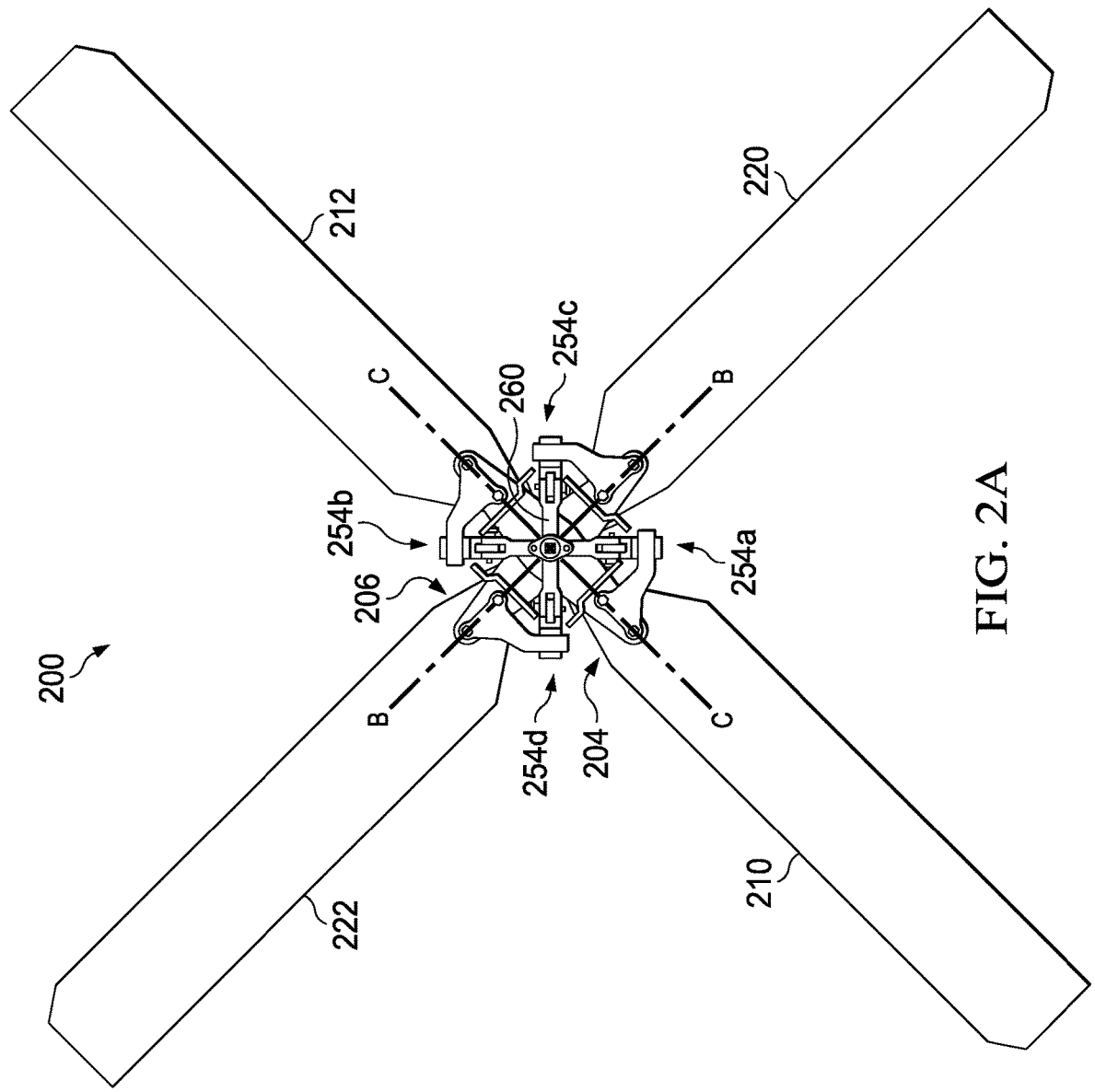
FIGS. 2A, 2B, and 2C are a top view, an orthogonal partial top view, and an orthogonal partial bottom view, respectively, of an example rotor hub system.
Figure 2B:
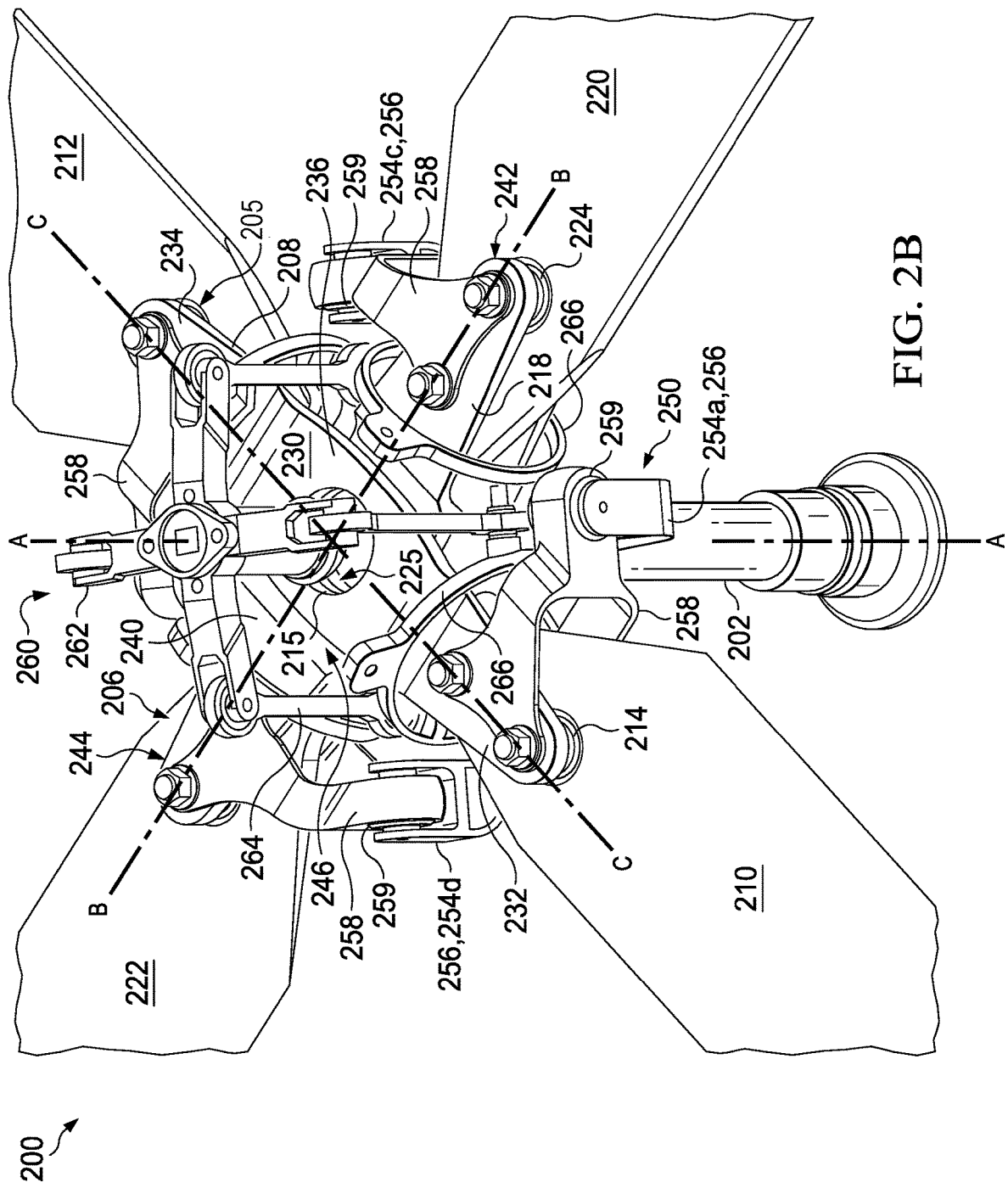
Figure 2C:
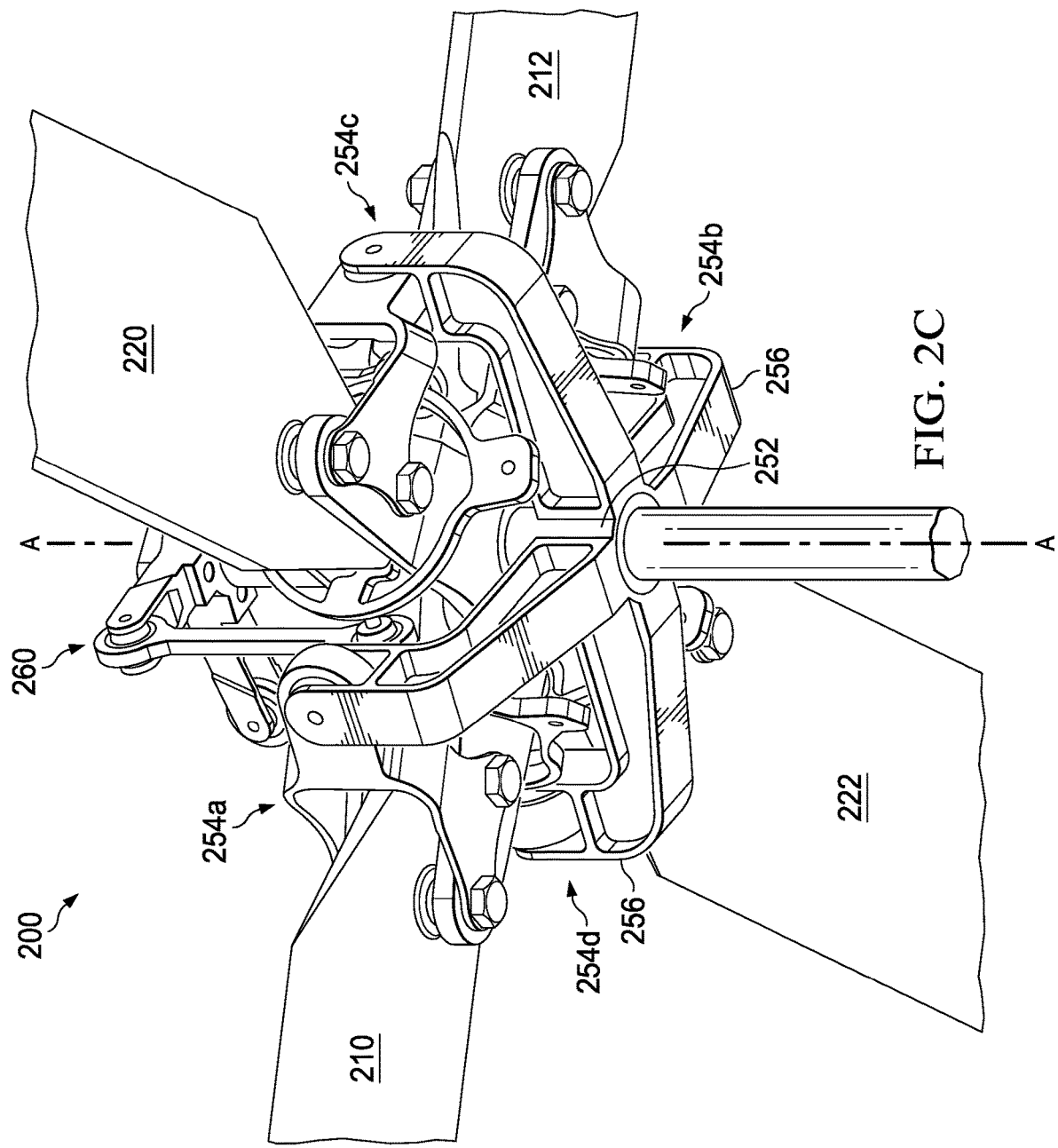

FIGS. 2A, 2B, and 2C are a top view, an orthogonal partial top view, and an orthogonal partial bottom view, respectively, of an example rotor hub system 200.

The example rotor hub system 200 can be used in the main rotary system 103 and/or the tail rotor assembly 113 of the example helicopter 101 of FIG. 1, or in other rotary systems. The example rotor hub system 200 includes a rotor mast 202, for example, that connects to a driveshaft of an engine. The rotor mast 202 is configured to rotate about a central rotational axis A-A (e.g., central longitudinal axis of the mast 202). Rotor mast 202 can transfer its rotational movement to a first set of rotor blades via a first teetering rotor hub 204 and to a second set of rotor blades via a second teetering rotor hub 206, where the first set of rotor blades and the second set of rotor blades are disposed in a shared, common plane.

The first teetering rotor hub 204 is disposed about the rotor mast 202, and is configured to teeter about a first teetering axis B-B. The first teetering rotor hub 204 includes a first yoke 208 connected to a first blade 210 and a second blade 212 via bearings 205, 214 (e.g., two-dimensional elastomeric bearings, Teflon® bearings, and/or other bearing types). The bearings 205, 214 connect the respective blades 210 and 212 to the first yoke 208, and can be stiff in all directions except the blades are allowed to change blade pitch. The first yoke 208 supports two pairs of bearings e.g., 205 and 214 (two additional bearings are not depicted) which support rotor blades 210 and 212, respectively, for example, such that the first rotor blade 210 is rotationally offset from the second rotor blade 212 by 180 degrees with respect to the central rotational axis A-A. The first blade 210 connects to a first end of the first yoke 208, and the second blade 212 connects to a second end of the first yoke 208 opposite the first end. In some implementations, the first yoke 208 is always rigid, and allows the first blade 210 and the second blade 212 to flap by bearings 259, for example, during operation of the rotor hub system 200 (e.g., during rotation of the rotor mast 202 and first teetering rotor hub 204). The first yoke 208 includes an opening 215 in a central portion of the first rotor yoke 208 to allow the rotor mast 202, and/or other components attached to the rotor mast 202, to pass through the first yoke 208 without contacting the first yoke 208.

The second teetering rotor hub 206 includes a second yoke 218 connected to a third blade 220 and a fourth blade 222 via bearings 224 (e.g., two-dimensional elastomeric bearings, teflon bearings, and/or other bearing types). The second yoke 218 supports the rotor blades 220 and 222 via bearings 224, for example, such that the third rotor blade 220 is rotationally offset from the fourth rotor blade 222 by 180 degrees with respect to the central rotational axis A-A. The third blade 220 connects to a first end of the second yoke 218, and the fourth blade 222 connects to a second end of the second yoke 218 opposite the first end via two pairs of bearings 224, 244 (and additional internal bearings not depicted). In some implementations, the second yoke 218 is similar to the first yoke 208, for example, in that the second yoke 218 teeters using bearings 259, and allows the third blade 220 and the fourth blade 222 to flap during operation of the rotor hub system 200 (e.g., during rotation of the rotor mast 202 and second teetering rotor hub 206). The second yoke 218 includes a second opening 225 in a central portion of the second yoke 218 to allow the rotor mast 202, and/or other components attached to the rotor mast 202, to pass through the second yoke 218 without contacting the second yoke 218.

The second teetering rotor hub 206 is disposed about the rotor mast 202 in a shared common plane with the first teetering rotor hub 204, but does not contact the first rotor hub 204. For example, the first teetering rotor hub 204 and second teetering rotor hub 206 coincide with each other to lie in the same plane and are disposed about the rotor mast 202, but are free from contact with each other and do not impart mechanical loads directly onto each other. The second teetering rotor hub 206 is configured to teeter about a second teetering axis C-C, which lies in the same plane as the first teetering axis B-B of the first teetering rotor hub 204. The second teetering rotor hub 206 is separate from the first teetering rotor hub 204, for example, in that the first rotor yoke 208 and the second rotor yoke 218 are free from contact with each other and do not impart mechanical loads on each other.

In some implementations, the second teetering rotor hub 206 is substantially similar in structure and function to the first teetering rotor hub 204, except that the second teetering rotor hub 206 is rotationally offset from the first teetering rotor hub 204 with respect to the central rotational axis A-A of the mast 202, and the first yoke 208 and the second yoke 218 are shaped to avoid contact between the first yoke 208 and the second yoke 218 while maintaining the teetering axes B-B and C-C of the first rotor hub 204 and the second rotor hub 206, respectively, in the same plane. The rotational offset of the first teetering rotor hub 204 from the second teetering rotor hub 206 is shown in FIGS. 2A-2C as ninety degrees relative to central rotational axis A-A, such that the rotor blades 210, 212, 220, and 222 are evenly spaced (i.e., evenly distributed) about the central rotational axis A-A. However, this angular offset can be different. For example, the offset can be about 90 degrees (e.g., substantially or exactly 90 degrees) plus or minus 15 degrees, such as between 75 and 105 degrees. In some examples, rotor blades 210 and 212 can be scissored (e.g., 20 degrees) from rotor blades 220 and 222. The rotational offset can be defined by the angle between a first spanwise axis (e.g., lengthwise axis through blades 210 and 212) of the first rotor hub 204 and a second spanwise axis (e.g., lengthwise axis through blades 220 and 222) of the second rotor hub 206 with respect to the central axis A-A. The first yoke 208 and the second yoke 218 are disposed about the rotor mast 202 to support the rotor blades 210, 212, 220, and 222 using bearings 205, 214 and 224, 244 in a common plane. At the same time, the first yoke 208 and the second yoke 218 are free from contact with each other while configured to independent flap, for example, up to about 15 degrees. The first yoke 208 and second yoke 218 connect to the rotor blades 210, 212, 220, and 222 as depicted, with the four drive members 254a-254d connected to the mast 202 along the longitudinal central axis A-A.

In the example rotor hub system 200 of FIGS. 2A-2C, the second yoke 218 includes a bridge portion while the first yoke 208 includes a flat plate. However, the shape and profile of the first yoke 208 and the second yoke 218 can vary. For example, the first yoke 208 and the second yoke can each include a bridge portion that overlap each other (e.g., are adjacent to and offset from each other). In some implementations, the shape and profile of the first yoke 208 and the second yoke 218 can vary, as long as the teetering axes of the first yoke 208 and the second yoke 218 lie in same plane and the rotor blades 210, 212, 220, and 222 are supported in the shared common plane by the first yoke 208 and the second yoke 218.

FIG. 3 is a schematic perspective view that shows the yoke components 230a, 230b (forming yoke 208), and yoke components 240a, 240b (forming yoke 218) in an exploded perspective as separate parts (top). In the middle portion of the figure, the pairs of yoke components (bridge plates 230a,230b, and 240a,240b) are positioned relative to each other to form first yoke 208 and second yoke 218, shown interlaced, and then are shown within the context of the rotor hub system 200. The first yoke 208 connects to the rotor blades 210, 212, and the second yoke 218 is connected to blades 220, 222 as depicted, with the four drive members 254a-254d connected to the blades 210, 212, 220, 222 and the mast 202 along the longitudinal central axis A-A.

Figure 4A:
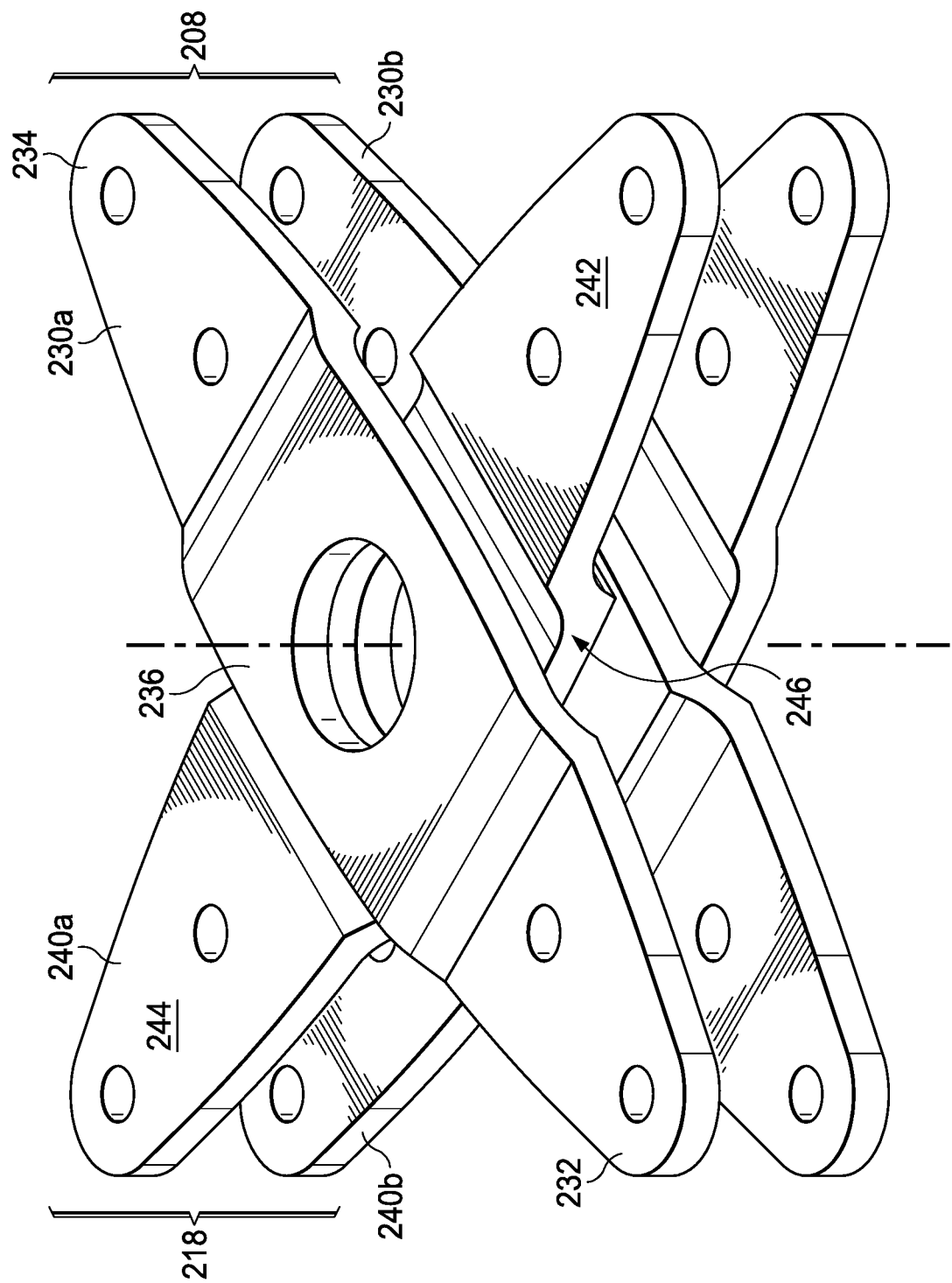
FIGS. 4A and 4B are an orthogonal partial top view and an orthogonal partial bottom view of an example rotor hub system.

FIGS. 4A to 4E show more detail of the first yoke 208 and second yoke 218 of rotor hub system 200 as shown in FIGS. 2A-2C and FIG. 3. FIG. 4A shows the first yoke 208 as having two plates 230a, 230b with openings that will connect the first yolk to a first blade and a second blade (not depicted). Similarly, the second yoke 218 is shown as having two bridge plates 240a, 240b, with openings that will permit connection to the third blade 220 and the fourth blade 222 (not depicted).

FIGS. 4A to 4E show various schematic perspective views, and schematic cross-sectional views of the first yoke 208 and the second yoke 218. The first yoke 208 includes a first bridge plate 230a extending between an upper surface of the first blade 210 and an upper surface of the second blade 212 (blades not depicted). The bridge plates 230a, 230b of the first yoke 208 include a bridge profile between the attachment points for the first blade 210 and the second blade 212 (blades not depicted), where each include a first end 232, a second end 234, and a central bridge portion 236 between the first end 232 and the second end 234 of the first yoke. The second yoke 218 includes bridge plates 240a, 240b, where each have a first end 242 and a second end 244 of the bridge plates 240a, 240b are connected by a bridge portion 246 having a surface profile that is offset from the first end 242 and the second end 244 of the second yoke 218 such that, in operation, the first yoke 208 and the second yoke 218 never come in contact. The first and second bridge plates 240a, 240b can be offset from the first end 242 and the second end 244 of the second yoke 218 by, e.g., at least a thickness of the first bridge plate 230a of the first yoke 208 and depicted as the lower bridge portion 246 being lower, or going under, the central bridge portion 236. The lower bridge portion 246 underlaps the central bridge portion 236 of the first and second bridge plates 230a, 230b such that the lower bridge portion 246 is adjacent to, but offset, from the central portion 236. In this configuration, the first end 232 and second end 234 of the first and second bridge plates 230a, 230b of the first yoke 208 lie in the same plane as the first end 242 and the second end 244 of the bridge plates 240a, 240b of the second yoke 218. The skilled arstisan will readily recognize that the first and second yokes 208 and 218 are interchangeable, so long as one has an upper bridge portion and one a lower bridge portion such that the yokes never come in contact, however, as a result of the offset created between the yokes 208 and 218, the blades connected thereto are on the same plane. The thickness, lengths, and bridge offset (e.g., offset distance of the bridge portion 246) of the rotor yokes can vary, for example, based on helicopter model, blade size, desired yoke flexibility, and/or other reasons. In some implementations, the thickness of the yokes can be, e.g., 2.5 to 10 centimeters, but in certain configurations may require more of less thickness.

Figure 4B:
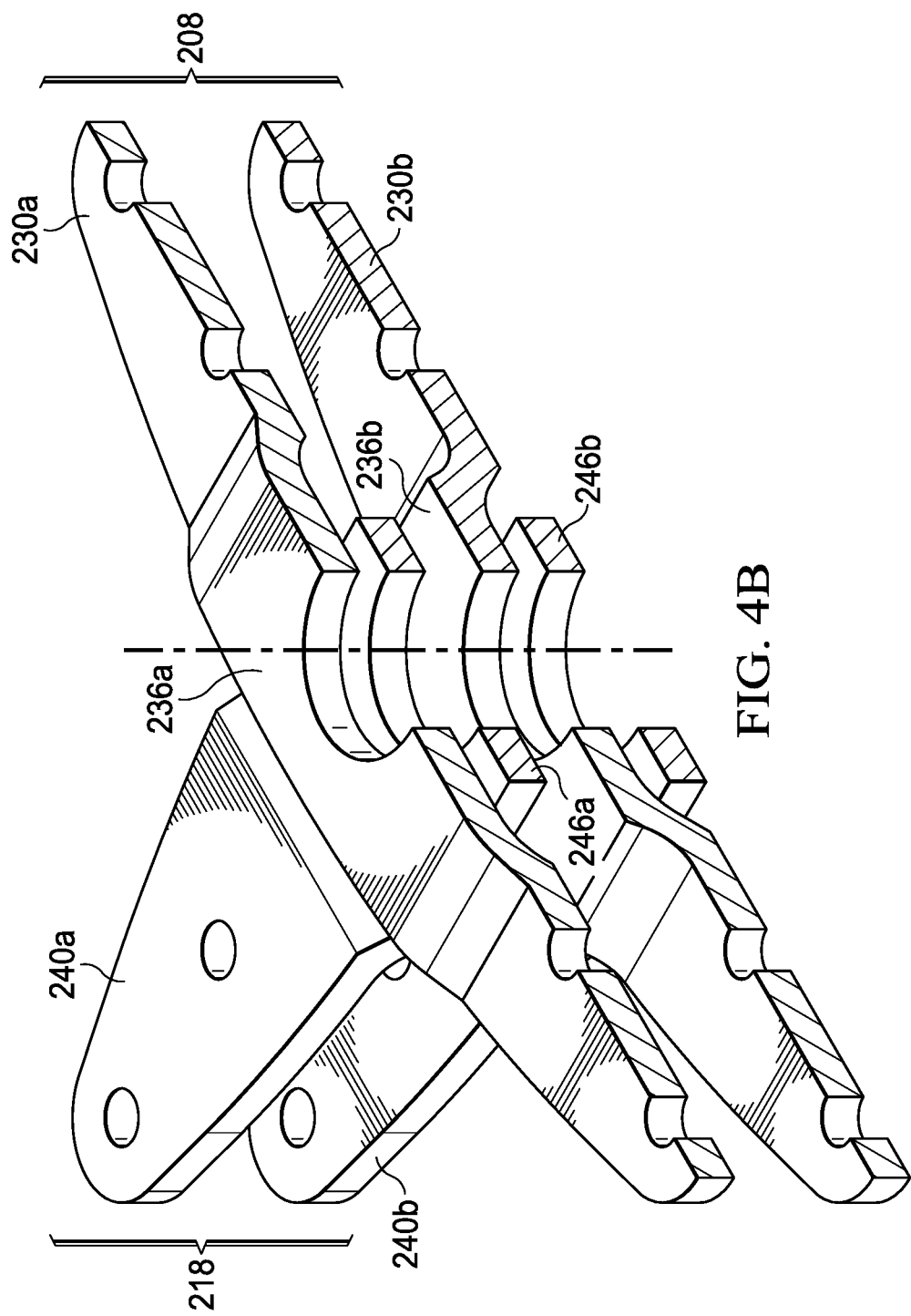

FIG. 4B is a perspective cross-section view of the first yoke 208 includes a first bridge plate 230a extending between an upper surface of the first blade 210 and an upper surface of the second blade 212 (blades not depicted) in relation to longitudinal line A-A. This view shows greater detail of the relative position of the upper bridge portions 236a, 236b of first yoke 208 and the lower bridge portions 246a, 246b of the second yoke 218.

Figure 4C:
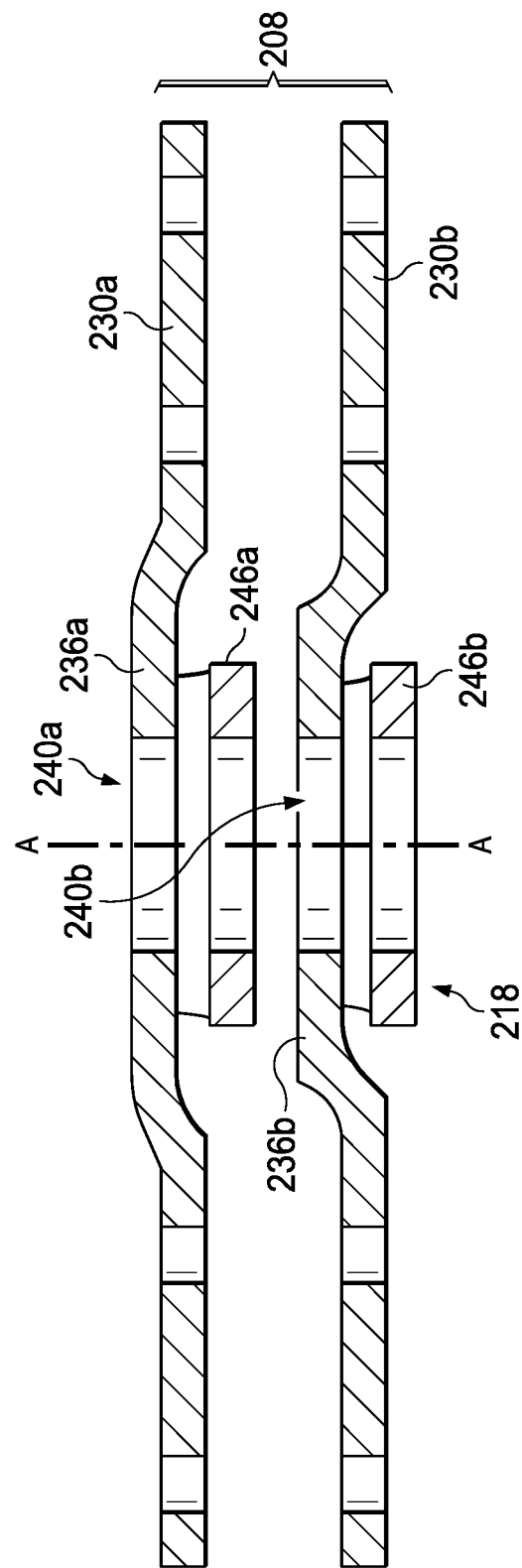
FIG. 4C shows a side, cross-sectional view of the yokes of the rotor hub system.

FIG. 4C is a side, cross-section view of the first yoke 208 includes a first bridge plate 230a extending between an upper surface of the first blade 210 and an upper surface of the second blade 212 (blades not depicted) in relation to longitudinal line A-A. This view also shows greater detail of the relative position of the upper bridge portions 236a, 236b of first yoke 208 and the lower bridge portions 246a, 246b of the second yoke 218.

Figure 4D:
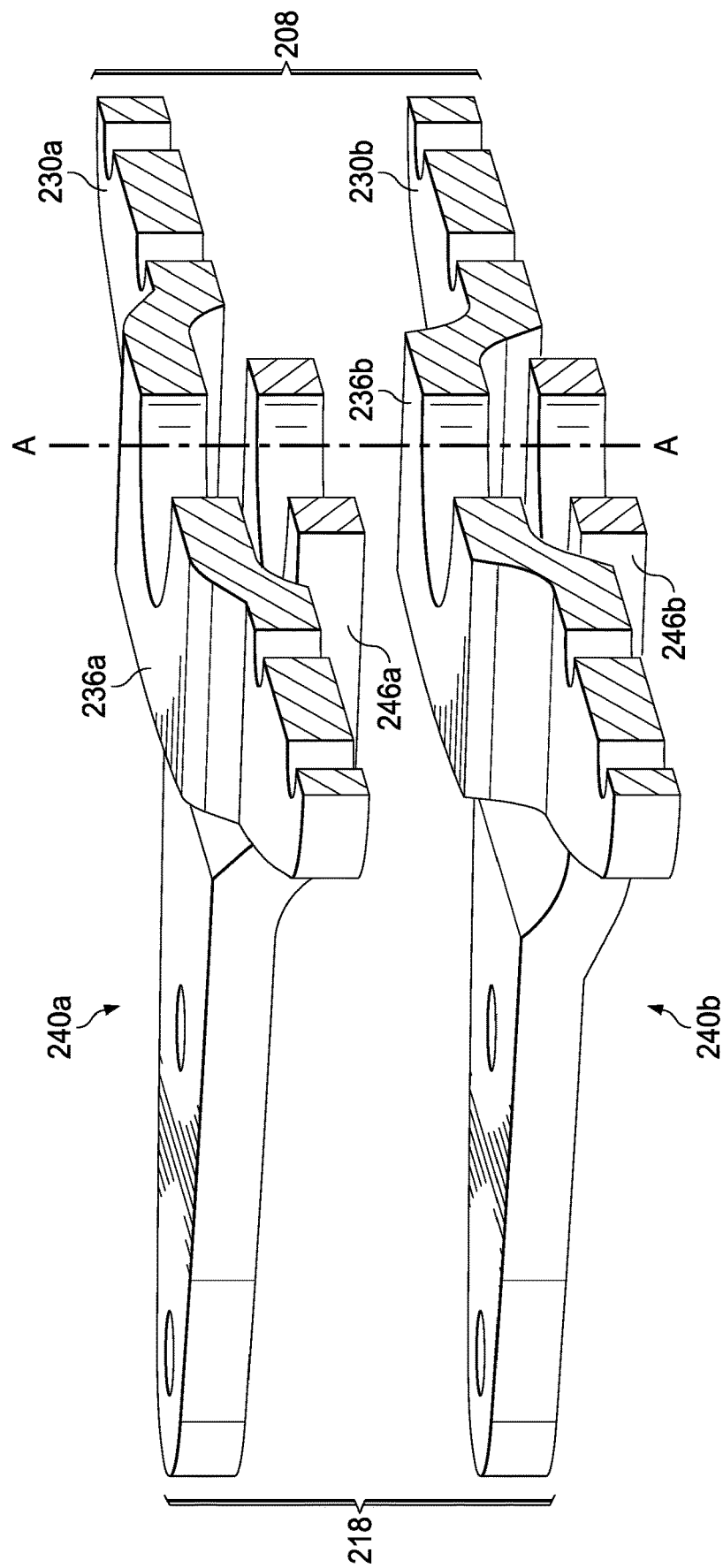
FIG. 4D shows another perspective, cross-sectional view of the yokes of the rotor hub system.

FIG. 4D shows another perspective, cross-section view of the first yoke 208 includes a first bridge plate 230a extending between an upper surface of the first blade 210 and an upper surface of the second blade 212 (blades not depicted) in relation to longitudinal line A-A. This view also shows greater detail of the relative position of the upper bridge portions 236a, 236b of first yoke 208 and the lower bridge portions 246a, 246b of the second yoke 218.

Figure 4E:
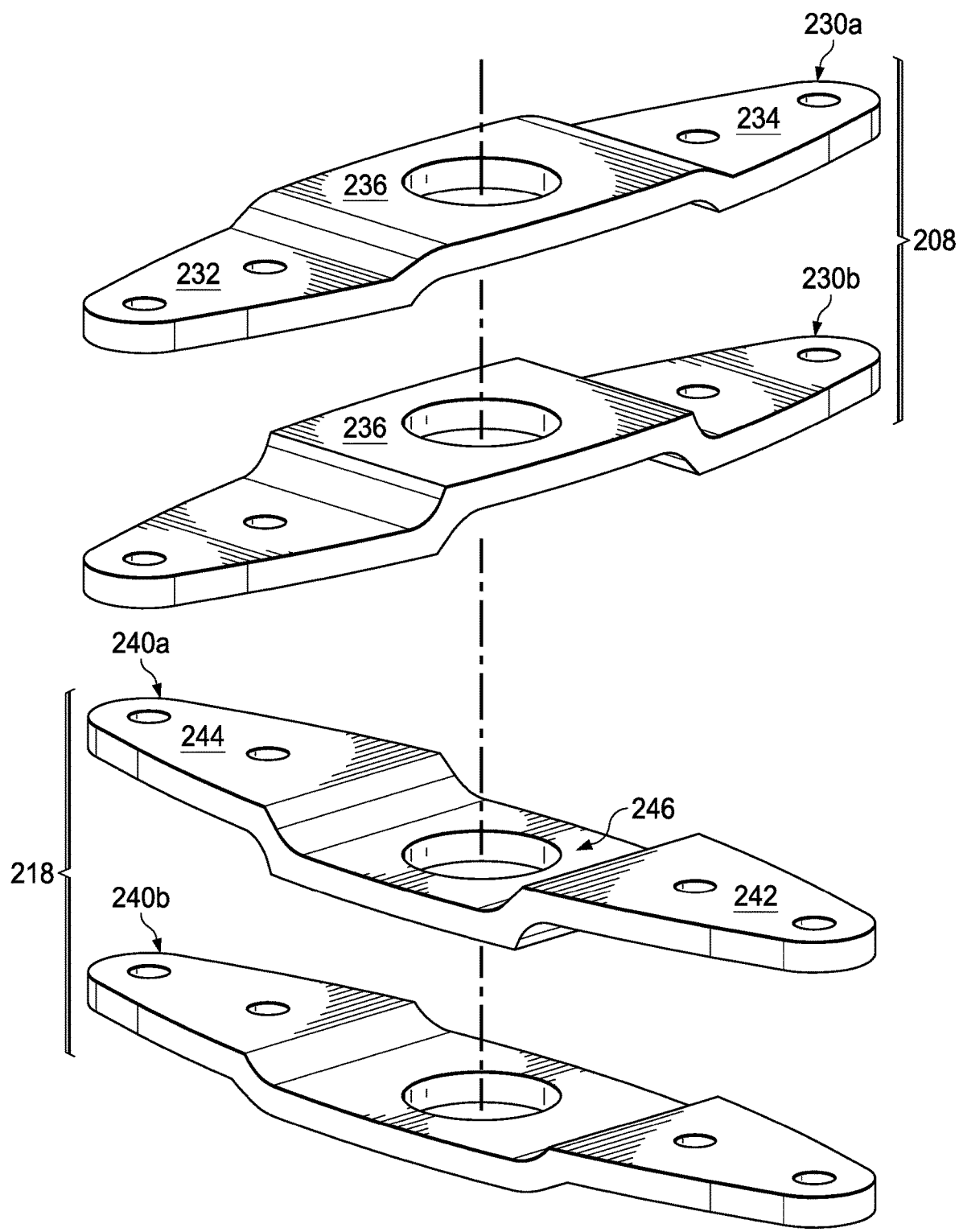
FIG. 4E shows another perspective view of the yokes of the rotor hub system.

FIG. 4E shows another perspective view of the first yoke 208 includes a first bridge plate 230a extending between an upper surface of the first blade and an upper surface of the second blade (blades not depicted) and demonstrates their position in relation to longitudinal line A-A. In addition, this figure shows how the first and second yokes 208 and 218 can include beveling to removal material from the first and second yokes 208 and 218 to reduce the mass while maintaining the structural integrity of the first and second yokes 208 and 218. Further, these figures also show that the two parts of the first and second yokes 208 and 218, bridge plates 230a, 230b and 240a, 240b, respectively, are shown as having slightly different shapes and profiles in the transition portion between their respective flat blade attachment portions 232/234 and 242/244, respectively, ending in the central portions 236, 246, respectively.

Figure 5:
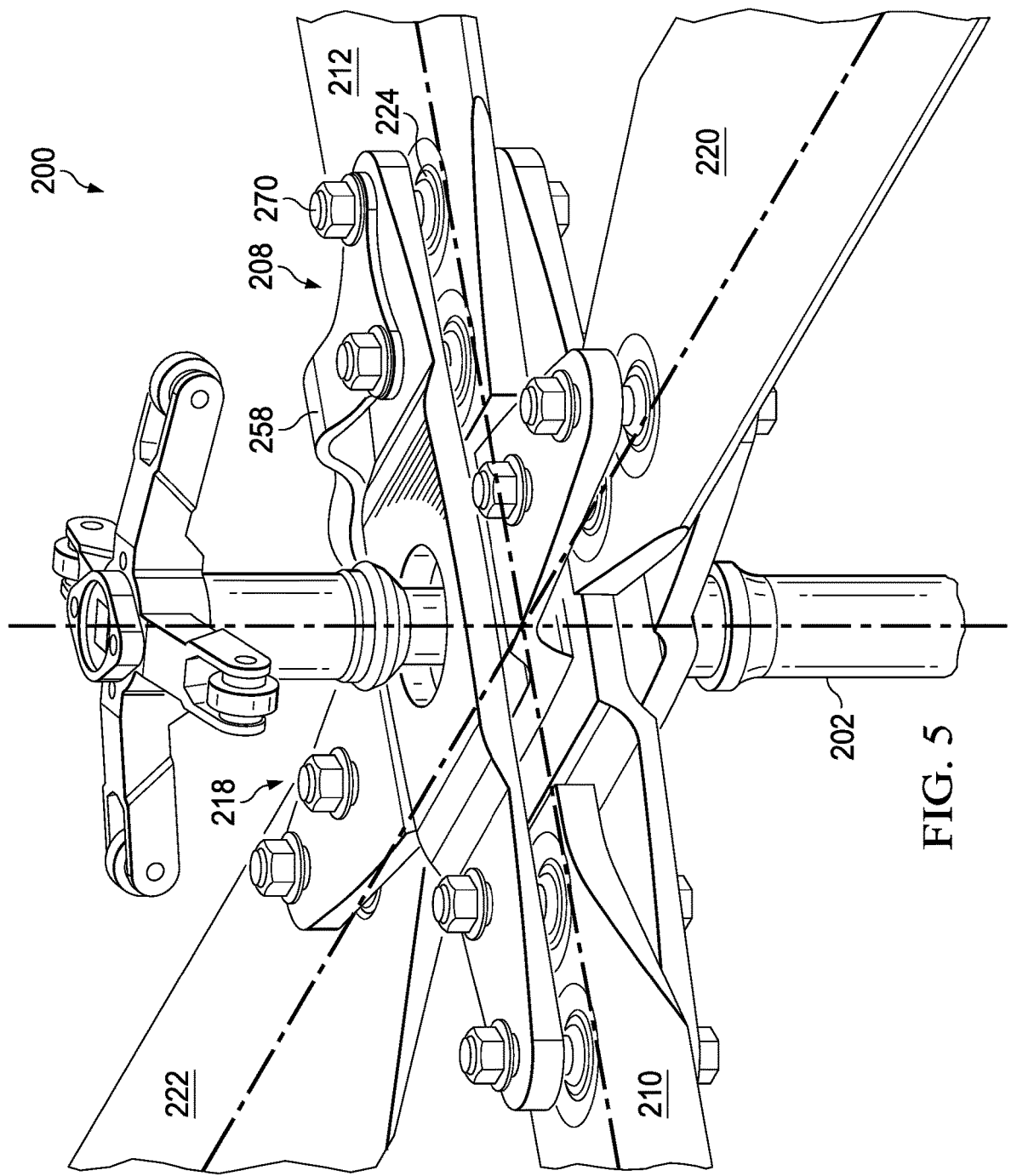
FIG. 5 show a perspective view of the rotor hub assembly with the yoke components of the rotor hub system.

FIG. 5 shows a perspective view of the rotor hub assembly system 200 with the yoke components from FIGS. 4A to 4E, specifically, the first and second yokes 208, 218, with first yoke 208 connected to the blades 210, 212, and second yoke 218 connected to blades 220, 222. This figure shows great detail of the bearings 224 (only one is labeled for simplicity) that surround the through bolts 270 that attach the blades 210, 212, 220, 222 to the first and second yokes 208, 218. For simplicity only one drive extension 258 is depicted.

Looking together at FIGS. 2B and 5, these figures show an example of a rotor hub system 200 further includes a drive hub assembly 250 connected to the mast 202 and coupled to the first yoke 208 and the second yoke 218. The drive hub assembly 250 transfers rotation of the rotor mast 202 about axis A-A to the first and second teetering rotor hubs 204 and 206, and drives the first yoke 208 and the second yoke 218 to rotate substantially about axis A-A. The drive hub assembly 250 includes a mast coupling 252 coupled to the mast 202, and four drive members 254a-254d extending from the mast coupling 252. A first drive member 254a connects to the first yoke 208 thru bearings 259 proximate the first rotor blade 210, a second drive member 254b connects to the first yoke 208 thru bearings 259 proximate the second rotor blade 212, a third drive member 254c connects to the second yoke 218—proximate the third rotor blade 220, and a fourth drive member 254d connects to the second yoke 218—proximate the fourth rotor blade 222. Each drive member 254 includes a drive hub arm 256 attached to the mast coupling 252 and extending outwardly (e.g., radially outwardly with respect to axis A-A) from the mast coupling 252, a drive extension 258 coupled to the drive hub arm 256 and its respective yoke, and a drive bearing 259 coupling the drive hub arm 256 to the drive extension 258. Each drive extension 258 is configured to pivot about its respective drive bearing 259, for example, to allow the respective yokes to teeter about its respective teetering axis (e.g., teetering axis B-B or C-C). Also, the pivoting movement of the drive extensions 258 about their respective drive bearings 259 allow the first yoke 208 and the second yoke 218 to flap up and down. The drive hub arms 256 of the first drive member 254a and the second drive member 254b form a goalpost shape, and the drive hub arms 256 of the third drive member 254c and the fourth drive member 254d also form a goalpost shape. Each drive hub arm 256 is configured to flex in torsion and substantially resist shear forces, for example, to allow the first yoke 208 and/or the second yoke 218 to lead and lag about the central rotational axis A-A (e.g., mast centerline). In some examples, the drive hub arms 256 allow the first yoke 208 and the second yoke 218 to independently lead/lag up to about three degrees. In some implementations, the torsional flexibility and shear rigidity of the drive hub arms 256 operate to independently relieve coriolis forces that can act on the rotor blades of one or both of the first teetering rotor hub 204 and the second teetering rotor hub 206. For example, the drive hub arms 256 can include an I-beam cross-section along its length to provide a softness in a rotational drive direction of the rotor hub system 200 and effect the torsional flexibility and shear rigidity of the drive hub arms 256.

The example rotor hub system 200 also includes a pitch assembly 260 connected to the rotor blades 210, 212, 220, 222. The pitch assembly 260 controls the collective pitch of the rotor blades 210, 212, 220, 222. The pitch assembly 260 includes a pitch hub 262 connected to the mast 202 and configured to translate along the mast 202 parallel to the central rotational axis A-A. Four pitch links 264 pivotly couple to the pitch hub 262, and four pitch horns 266 couple to the pitch links 264 and to the four rotor blades 210, 212, 220, and 222. In some implementations, the pitch hub 262 connects to a single degree of freedom collective control system to collectively control the pitch of each of the rotor blades 210, 212, 220, and 222. The example pitch assembly 260 of FIGS. 2A-2C show the pitch hub 262 as a cross-head shape to allow collective pitch control of the rotor blades 210, 212, 220, and 222.

In the example rotor hub system 200 of FIGS. 2A-2C, the drive hub assembly 250 connects to the first yoke 208 and the second yoke 218 at locations radially outward of the pitch assembly 260 with respect to the central rotational axis A-A. However, the drive hub assembly 250 can connect to the first yoke 208 and the second yoke 218 at different locations than shown in FIGS. 2A-2C. For example, in some instances, the drive hub assembly 250 connects to the first yoke 208 and second yoke 218 at locations radially inward of the pitch assembly 260.

Figure 6A:
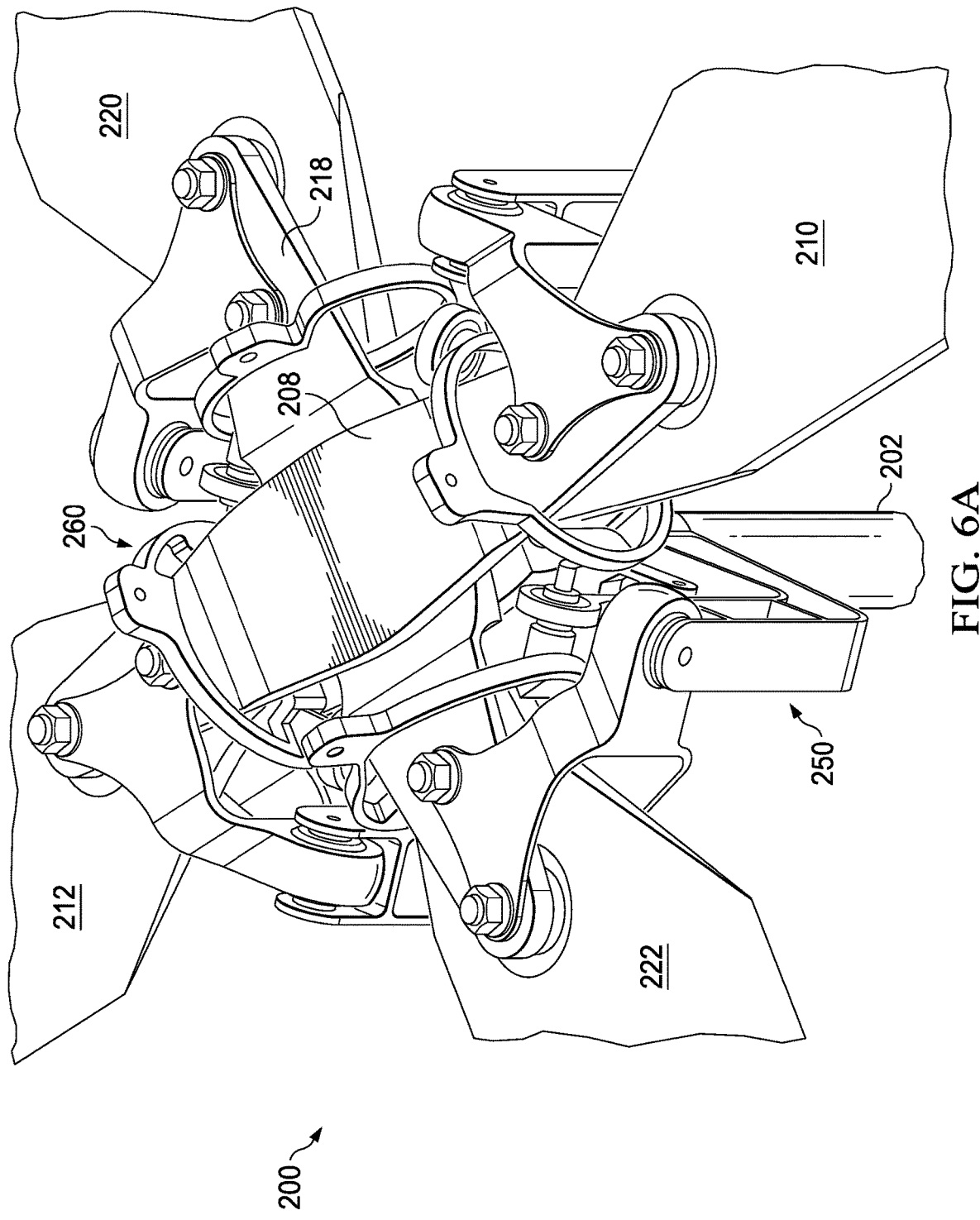

In the example rotor hub system 200 of FIGS. 6A-6B, the drive hub assembly 250 extends from the mast 202 on a first, lower side of the yokes 208 and 218, and the pitch assembly 260 extends from the mast 202 on a second, upper side of the yokes 208 and 218 opposite the first, lower side. However, the drive hub assembly 250 and the pitch assembly 260 can be disposed differently with respect to the first yoke 208 and the second yoke 218. For example, the drive hub assembly 250 can extend from the mast 202 on the second, upper side of the yokes 208 and 218, and the pitch assembly 260 can extend from the mast 202 on the first, lower side of the yokes 208 and 218. In some implementations, the drive hub assembly 250 and the pitch assembly 260 can extend from the mast 202 on the same side of the yokes 208 and 218, whether it is the first, lower side or the second, upper side.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. A rotor hub system, comprising:
    a first teetering rotor hub disposed about a mast, the first teetering rotor hub comprising:
        a first yoke that is substantially flat having a bridge shape on a first plane;
        a first set of rotor blades connected to the first yoke, the first set of rotor blades comprising a first rotor blade connected at a first end of the first yoke and a second rotor blade connected at a second end of the first yoke opposite the first end;
    a second teetering rotor hub separate from the first teetering rotor hub, the second teetering rotor hub comprising:
        a second yoke that is substantially flat having an inverse bridge shape on a second plane; and
        a second set of rotor blades connected to the second yoke, the second set of rotor blades comprising a third rotor blade connected at a first end of the second yoke and a fourth rotor blade connected at a second end of the second yoke opposite the first end, wherein the first and second sets of rotor blades are in the same plane and the first and second yokes never come in contact.

2. The rotor hub system of claim 1, wherein the first teetering rotor hub is free from contact with the second teetering rotor hub.

3. The rotor hub system of claim 1, wherein the first set of rotor blades are rotatably offset from the second set of rotor blades by about ninety degrees with respect to a central longitudinal axis of the mast.

4. The rotor hub system of claim 1, wherein the first yoke comprises a bridge portion adjacent to and offset from a portion of the second yoke.

5. The rotor hub of claim 4, wherein the second yoke comprises a second bridge portion adjacent to and offset from the bridge portion of the first yoke.

6. The rotor hub system of claim 1, further comprising:
    a pitch assembly connected to the first set of rotor blades and the second set of rotor blades, the pitch assembly configured to control a pitch of the first set of rotor blades and the second set of rotor blades; and
    a drive hub assembly connected to a mast and coupled to the first yoke and the second yoke, the drive hub assembly configured to drive the first yoke and the second yoke in response to rotation of the mast.

7. The rotor hub system of claim 6, wherein the drive hub assembly comprises a mast coupling and a first, a second, a third and a fourth drive member extending from the mast coupling, wherein the first drive member is coupled to the first yoke proximate the first rotor blade, the second drive member is coupled to the first yoke proximate the second rotor blade, the third drive member is coupled to the second yoke proximate the third rotor blade, and the fourth drive member is coupled to the second yoke proximate the fourth rotor blade.

8. The rotor hub system of claim 7, wherein each of the drive members comprises:
   a drive hub arm attached to the mast coupling and extending outwardly from the mast coupling;
   a drive extension coupled to the drive hub arm and a respective yoke; and
   a drive bearing coupling the drive hub arm to the drive extension, wherein the drive extension is configured to pivot about the drive bearing.

9. The rotor hub system of claim 8, wherein each of the drive hub arms is configured to flex in torsion and resist shear forces.

10. The rotor hub system of claim 8, wherein each of the drive hub arms comprises an I-beam cross section along a length of the respective drive hub arm.

11. The rotor hub system of claim 6, wherein the drive hub assembly connects to the first yoke and the second yoke at locations radially outward of the pitch assembly with respect to a central longitudinal axis of the mast.

12. The rotor hub system of claim 6, wherein the drive hub assembly extends from the mast on a first, lower side of the first yoke, and the pitch assembly extends from the mast on a second, upper side of the first yoke opposite the first, lower side.

13. The rotor hub system of claim 6, wherein the drive hub assembly and the pitch assembly each extend from the mast on a first, lower side of the first yoke.

14. The rotor hub system of claim 6, wherein the pitch assembly comprises a pitch hub connected to the mast, a plurality of pitch links pivotly coupled to the pitch hub, and a plurality of pitch horns coupled to the pitch links and the first set of rotor blades and the second set of rotor blades.

15. The rotor hub system of claim 14, wherein the pitch hub connects to a single degree of freedom collective control system.

16. A tail rotor hub system, comprising:
   a first yoke that is substantially flat having a bridge shape and forming a first plane and a second yoke that is substantially flat disposed about a rotor mast having an inverse bridge shape and forming a second plane, wherein the first plane and the second plane are parallel and the first and second yokes do not come in contact, wherein a first portion of the first yoke overlaps a second portion of the second yoke, the first portion and the second portion spaced separately from each other, the first yoke configured to teeter about a first teetering axis, and the second yoke configured to teeter about a second teetering axis, wherein the first teetering axis and the second teetering axis are disposed in a common plane;
   a first set of rotor blades connected to the first yoke, the first set of rotor blades comprising a first rotor blade connected at a first end of the first yoke and a second rotor blade connected at a second end of the first yoke opposite the first end; and
   a second set of rotor blades connected to the second yoke, the second set of rotor blades comprising a third rotor blade connected at a first end of the second yoke and a fourth rotor blade connected at a second end of the second yoke opposite the first end.

17. The tail rotor hub system of claim 16, wherein the first set of rotor blades and the second set of rotor blades are disposed in the common plane.

18. The tail rotor hub system of claim 16, wherein the first set of rotor blades are offset from the second set of rotor blades by about ninety degrees.

19. The tail rotor hub system of claim 16, further comprising:
   a drive hub assembly coupled to the rotor mast, the first yoke, and the second yoke, the drive hub assembly configured to drive the first yoke and the second yoke in response to rotation of the rotor mast, the drive hub assembly comprising:
   a plurality of drive hub arms attached to the rotor mast and extending outwardly from the rotor mast;
   a plurality of drive extensions coupled to the plurality of drive hub arms and the first yoke and the second yoke; and
   a plurality of drive bearings coupling the plurality of drive hub arms to the plurality of drive extensions, wherein the plurality of drive extensions are configured to teeter about the plurality of drive bearings.

20. The tail rotor hub system of claim 19, wherein a first drive extension of the plurality of drive extensions attaches to the first end of the first yoke, a second drive extension of the plurality of drive extensions attaches to the second end of the first yoke, a third drive extension of the plurality of drive extensions attaches to the first end of the second yoke, and a fourth drive extension of the plurality of drive extensions attaches to the second end of the second yoke.

21. The tail rotor hub system of claim 19, further comprising a pitch assembly connected to the first set of rotor blades and the second set of rotor blades, the pitch assembly configured to control a pitch of the first set of rotor blades and the second set of rotor blades.

22. The tail rotor hub system of claim 21, wherein the drive hub assembly connects to the first yoke and the second yoke at locations radially outward of the pitch assembly with respect to a rotational axis of the mast.

23. A method, comprising:
   providing a first teetering rotor hub about a mast, the first teetering rotor hub comprising:
   a first yoke comprising two first that is substantially flat plates lying on parallel first planes;
   a first set of rotor blades connected to the first yoke, the first set of rotor blades comprising a first rotor blade connected at a first end of the first yoke and a second rotor blade connected at a second end of the first yoke opposite the first end;
   providing a second teetering rotor hub about the mast and separate from the first teetering rotor hub, the second teetering rotor hub comprising:
   a second yoke comprising two second substantially flat plates lying on parallel second planes, the second planes being parallel to the first planes; and
   a second set of rotor blades connected to the second yoke, the second set of rotor blades comprising a third rotor blade connected at a first end of the second yoke and a fourth rotor blade connected at a second end of the second yoke opposite the first end; and
   disposing a first teetering axis of the first teetering rotor hub and a second teetering axis of the second teetering rotor hub in parallel planes.

* * * * *